(12) United States Patent
Kosaka et al.

(10) Patent No.: US 8,656,719 B2
(45) Date of Patent: Feb. 25, 2014

(54) THERMAL POWER PLANT, STEAM TURBINE AND CONTROL METHOD FOR A THERMAL POWER PLANT

(75) Inventors: Tetsuya Kosaka, Hitachi (JP); Nobuyoshi Mishima, Hitachi (JP); Takashi Sugiura, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 262 days.

(21) Appl. No.: 13/344,435

(22) Filed: Jan. 5, 2012

(65) Prior Publication Data

US 2012/0227406 A1 Sep. 13, 2012

(30) Foreign Application Priority Data

Mar. 7, 2011 (JP) ................... 2011-048484

(51) Int. Cl.
*F01K 17/00* (2006.01)
*F01K 13/02* (2006.01)
*F01K 23/06* (2006.01)
*F01K 13/00* (2006.01)
*B01D 53/14* (2006.01)

(52) U.S. Cl.
USPC ............... 60/648; 60/652; 60/670; 60/677; 95/179

(58) Field of Classification Search
USPC ............. 60/645–681; 48/127.9; 423/437.1; 110/216, 341–346; 95/163, 179
See application file for complete search history.

(56) References Cited

U.S. PATENT DOCUMENTS

| | | | |
|---|---|---|---|
| 6,883,327 B2 | 4/2005 | Iijima et al. | |
| 8,062,408 B2* | 11/2011 | Chen et al. | .................. 95/163 |
| 2006/0248890 A1 | 11/2006 | Iijima et al. | |
| 2010/0326074 A1* | 12/2010 | Okita et al. | .................. 60/648 |
| 2011/0011088 A1* | 1/2011 | Iijima et al. | .................. 60/645 |
| 2011/0120128 A1* | 5/2011 | Handagama et al. | ........... 60/649 |
| 2011/0120130 A1* | 5/2011 | Mishima et al. | ............... 60/660 |
| 2011/0232286 A1* | 9/2011 | Mishima et al. | ............... 60/670 |

FOREIGN PATENT DOCUMENTS

| | | |
|---|---|---|
| EP | 1 688 173 A2 | 8/2006 |
| GB | 2470645 A | 12/2010 |
| JP | 10-169411 | 6/1998 |
| JP | 2004-323339 A | 11/2004 |

(Continued)

OTHER PUBLICATIONS

Pfaff I. et al.: "Optimised Integration of Post-Combustion CO₂ Capture Process in Greenfield Power Plants", Energy, Pergamon Press, Oxford, GB, vol. 35, No. 10, Oct. 1, 2010, pp. 4030-4041.

(Continued)

*Primary Examiner* — Thomas E. Denion
*Assistant Examiner* — Laert Dounis
(74) *Attorney, Agent, or Firm* — Crowell & Moring LLP (57) ABSTRACT

A thermal power plant includes a boiler for burning fossil fuel to generate steam, a steam turbine including a high-pressure turbine, an intermediate-pressure turbine, and a low-pressure turbine which are driven by steam generated in the boiler, an absorber for absorbing and capturing $CO_2$ contained in boiler exhaust gas discharged from the boiler in an absorbing liquid, a desorber for circulating the absorbing liquid between the desorber and the absorber and separating $CO_2$ from the absorbing liquid that has absorbed $CO_2$, a reboiler for feeding a heating source for separating $CO_2$ from the absorbing liquid to the desorber, a steam pipe system for feeding steam taken out from the high-pressure turbine and the intermediate-pressure turbine to the reboiler, and a steam feed source switching device.

14 Claims, 7 Drawing Sheets

(56) References Cited

FOREIGN PATENT DOCUMENTS

| JP | 2006-213580 | | 8/2006 |
|---|---|---|---|
| JP | 4274846 | B2 | 3/2009 |
| JP | 2010-275925 | | 12/2010 |
| JP | 2011-020090 | | 2/2011 |

OTHER PUBLICATIONS

Extended European Search Report dated Jul. 2, 2012 (seven (7) pages).

Justin Zachary et al., "CO2 Capture and Sequestration Options-Impact on Turbomachinery Design", 2008, vol. 1, No. 1, Bechtel Corporation, pp. 1-20.

* cited by examiner

THERMAL POWER PLANT, STEAM TURBINE AND CONTROL METHOD FOR A THERMAL POWER PLANT

CLAIM OF PRIORITY

The present application claims priority from Japanese patent application JP 2011-048484 filed on Mar. 7, 2011, the content of which is hereby incorporated by reference into this application.

BACKGROUND OF THE INVENTION

1. Field of the Invention

The present invention relates to a thermal power plant and more particularly to a fossil fuel combustion thermal power plant including a carbon dioxide separation and capture apparatus, a steam turbine and a control method for a thermal power plant.

2. Description of Related Art

As a fossil fuel combustion thermal power system including a carbon dioxide separation and capture apparatus, for example, there is a system including an apparatus (PCC: post combustion $CO_2$ capture) for separating and capturing carbon dioxide from combustion exhaust gas of a coal combustion boiler using a $CO_2$ absorbing liquid. As a conventional technology of this system, there is a system including a steam turbine having a high-pressure turbine, an intermediate-pressure turbine, and a low-pressure turbine, a boiler for generating steam for driving these turbines, a $CO_2$ absorber for absorbing and removing $CO_2$ from combustion gas of the boiler using the $CO_2$ absorbing liquid, a desorber for desorbing the $CO_2$ absorbing liquid that has absorbed $CO_2$, and a reboiler for feeding a heating source for separating $CO_2$ from the absorbing liquid to the desorber.

Generally, a conventional carbon dioxide separation and capture apparatus for capturing $CO_2$ from exhaust gas of the boiler drives an absorbing liquid circulation pump to circulate the $CO_2$ absorbing liquid between the absorber and the desorber, absorbs $CO_2$ contained in boiler exhaust gas into the absorbing liquid by the absorber, and separates and captures $CO_2$ absorbed in the absorbing liquid by the desorber. For the heating source for separating $CO_2$ from the absorbing liquid by the desorber, steam fed from the reboiler is used and for the heating source of the reboiler, a part of steam taken out from the high-pressure and intermediate-pressure turbines is used (refer to Patent document 1).

{Patent document 1} Japanese Patent No. 4274846

SUMMARY OF INVENTION

As per the prior art described in the Patent document 1, the system for feeding steam which is a heating source to the reboiler of the desorber from the steam turbine is proposed. However, in the prior art there is the technical problem as mentioned below.

A thermal power plant is characterized in that it can respond to changes in the power demand. If the thermal power plant is partially loaded due to a reduction in the power demand, the steam pressure fed from the boiler is lowered, thus the pressure of each section of the plant becomes lower than the designed value. Therefore, for steam to be fed to the reboiler of the desorber from the steam turbine, a necessary pressure (about 0.4 MPa) may not be ensured.

Therefore, an object of the present invention is to provide a thermal power plant, a steam turbine and a control method for a thermal power plant, even at the time of the partial load operation of the steam turbine, capable of permitting the steam pressure fed to the reboiler of the desorber from the steam turbine to satisfy the required pressure of the carbon dioxide separation and capture apparatus and maintaining the operation of the carbon dioxide separation and capture apparatus.

To accomplish the above object, the thermal power plant of the present invention comprising: a boiler for burning fossil fuel to generate steam, a steam turbine including a high-pressure turbine, an intermediate-pressure turbine, and a low-pressure turbine which are driven by steam generated in the boiler, an absorber for absorbing and capturing $CO_2$ contained in boiler exhaust gas discharged from the boiler in an absorbing liquid, a desorber for circulating the absorbing liquid between the desorber and the absorber and separating $CO_2$ from the absorbing liquid that has absorbed $CO_2$, a reboiler for feeding a heating source for separating $CO_2$ from the absorbing liquid to the desorber, a steam pipe system for feeding steam taken out from the high-pressure turbine and the intermediate-pressure turbine to the reboiler, and a steam feed source switching device which is installed in the steam pipe system for switching a steam feed source for feeding steam to the reboiler between the high-pressure turbine and the intermediate-pressure turbine so as to satisfy a steam pressure required by the reboiler while the steam turbine is under a partial load operation.

The control method for a thermal power plant of the present invention comprising: a boiler for burning fossil fuel to generate steam, a steam turbine including a high-pressure turbine, an intermediate-pressure turbine, and a low-pressure turbine which are driven by the steam generated in the boiler, a carbon dioxide separation and capture apparatus including an absorber for absorbing and capturing $CO_2$ contained in boiler exhaust gas discharged from the boiler into an absorbing liquid, a desorber for circulating the absorbing liquid between the desorber and the absorber and separating $CO_2$ from the absorbing liquid that has absorbed $CO_2$, and a reboiler for feeding a heating source for separating $CO_2$ from the absorbing liquid to the desorber, and a steam pipe system for feeding steam taken out from the high-pressure turbine and the intermediate-pressure turbine to the reboiler, wherein: a steam feed source for feeding steam to the reboiler is controlled to switch from the intermediate-pressure turbine to the high-pressure turbine when the pressure of the steam fed from the intermediate-pressure turbine to the reboiler is equal to or lower than the steam pressure required by the reboiler.

And the steam turbine of the present invention comprising: a boiler for burning fossil fuel to generate steam, a steam turbine including a high-pressure turbine, an intermediate-pressure turbine and a low-pressure turbine which are driven by the steam generated in the boiler, a carbon dioxide separation and capture apparatus for separating and capturing carbon dioxide from exhaust gas discharged from the boiler, to which the steam is fed from the high-pressure turbine and the intermediate-pressure turbine, and a steam feed source switching device is installed for switching a steam feed source for feeding steam to the carbon dioxide separation and capture apparatus between the high-pressure turbine and the intermediate-pressure turbine so as to satisfy a steam pressure required by the carbon dioxide separation and capture apparatus while the steam turbine is under a partial load operation.

According to the present invention, a thermal power plant, a steam turbine and a control method for a thermal power plant can be realized, even at the time of the partial load operation of the steam turbine, capable of permitting the steam pressure fed to the reboiler of the desorber from the steam turbine to satisfy the required pressure of the carbon dioxide separation and capture apparatus and maintaining the operation of the carbon dioxide separation and capture apparatus.

DETAILED DESCRIPTION OF THE INVENTION

The embodiments of the present invention will be explained below with reference to the accompanying drawings.

{Embodiment 1}

Figure 1:
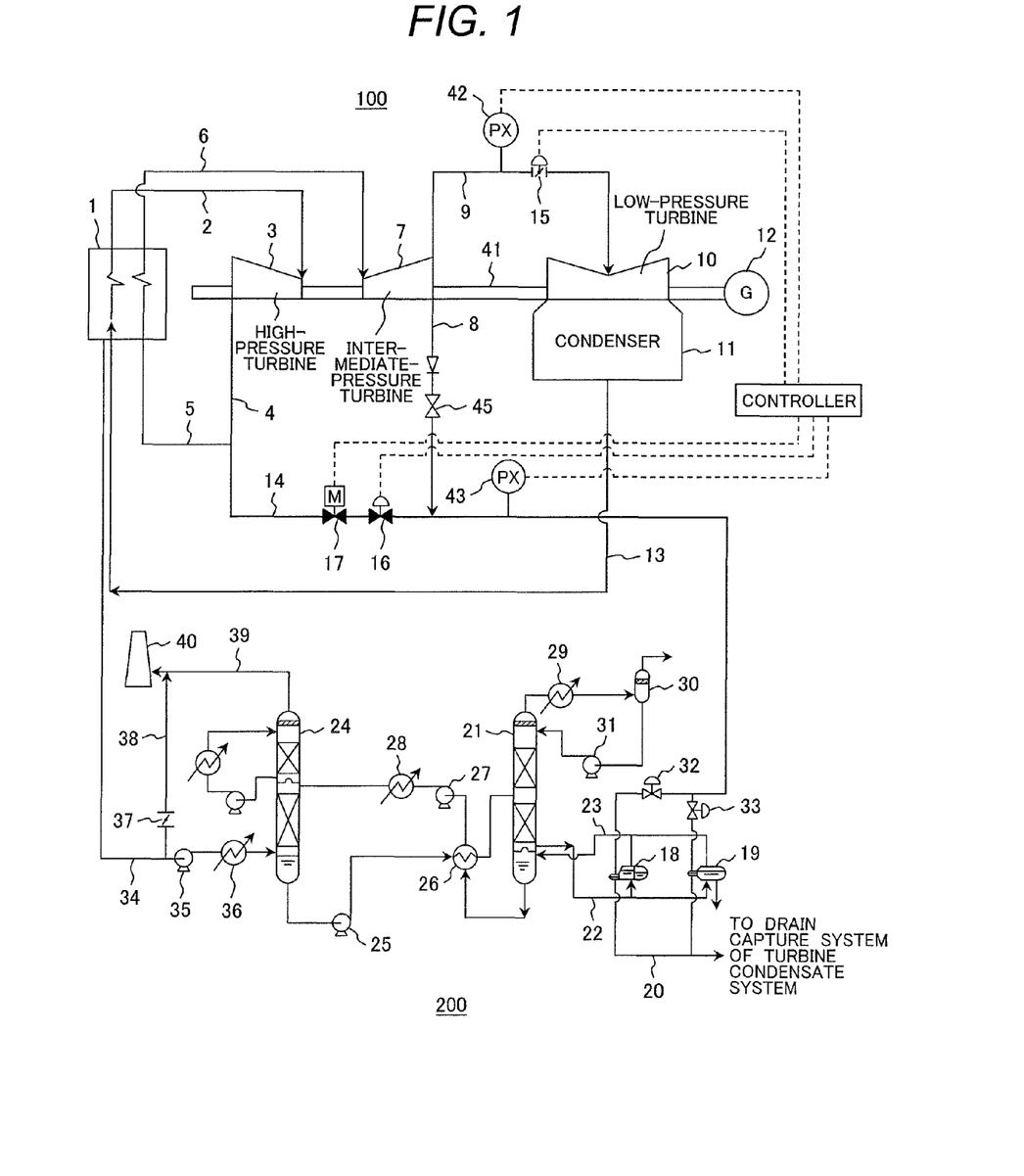
FIG. 1 is a schematic system block diagram of the thermal power plant including the carbon dioxide separation and capture apparatus relating to the embodiment of the present invention.

FIG. 1 shows a schematic system block diagram of the thermal power plant including the carbon dioxide separation and capture apparatus of this embodiment.

A steam turbine 100 will be explained below. As shown in FIG. 1, the steam turbine 100 includes a boiler 1 for burning fossil fuel to generate steam, a steam turbine having a high-pressure turbine 3, an intermediate-pressure turbine 7, and a low-pressure turbine 10 which are driven to rotate by the steam generated by the boiler 1, a generator 12 for converting the turning force of the steam turbine to electric power, a condenser 11 for condensing the steam for driving to rotate the steam turbine to water, and a water feed system 13 for feeding the feed water condensed to water by the condenser 11 to the boiler 1.

The boiler 1 heats feed water fed from the condenser 11 by heat obtained by burning fossil fuel and generates high-temperature and high-pressure steam. The steam generated by the boiler 1 flows down through a main steam pipe 2, is fed to the high-pressure turbine 3, and is reduced in pressure due to power generated in the high-pressure turbine 3. The steam driving the high-pressure turbine 3 flows down through a high-pressure turbine exhaust pipe 4 and a cold reheat pipe 5, is returned again to the boiler 1, and is reheated to hot reheat steam by the boiler 1. The reheat steam reheated by the boiler 1 flows down through a hot reheat pipe 6 from the boiler, is fed to the intermediate-pressure turbine 7, and is reduced in pressure due to power generated in the intermediate-pressure turbine 7. The steam driving the intermediate-pressure turbine 7 flows down through a crossover pipe 9 which is a connection pipe for connecting the intermediate-pressure turbine 7 and the low-pressure turbine 10, is fed to the low-pressure turbine 10, and is further reduced in pressure due to power generated in the low-pressure turbine 10. The steam driving the low-pressure turbine 10 is fed to the condenser 11 and is cooled and condensed to water by the condenser 11. The condensate condensed to water by the condenser 11 flows down through the feed water pipe 13 as feed water and is fed again to the boiler 1.

The high-pressure turbine 3, the intermediate-pressure turbine 7, the low-pressure turbine 10, and the generator 12 are connected to each other via a turbine rotor 41 and each electric power of the high-, intermediate-, and low-pressure turbines is transferred to the generator 12 via the turbine rotor 41 and is taken out as electric power.

Next, a carbon dioxide separation and capture apparatus 200 will be explained. As shown in FIG. 1, the carbon dioxide separation and capture apparatus 200 includes an absorber 24 for absorbing carbon dioxide contained in boiler exhaust gas discharged from the boiler 1 of the steam turbine 100 by an absorbing liquid, a desorber 21 for separating carbon dioxide from the absorbing liquid that has absorbed carbon dioxide at the absorber 24, and a reboiler 18 that feeds to the desorber 21 a heat source for generating steam and separating carbon dioxide from the absorbing liquid.

The boiler 1, when burning fossil fuel such as coal, generates boiler exhaust gas containing carbon dioxide. The boiler exhaust gas generated by the boiler 1 flows down through a boiler exhaust gas pipe 34 from the boiler 1 and is fed to a feed gas blower 35 to increase the pressure. The boiler exhaust gas pressurized by the feed gas blower 35 is fed to a boiler exhaust gas cooler 36 to be cooled and then is fed to the absorber 24.

Carbon dioxide in the boiler exhaust gas fed to the absorber 24 is absorbed in the absorbing liquid in the absorber 24, so that the boiler exhaust gas becomes processed gas containing no carbon dioxide. The processed gas flows down through an absorber exit boiler exhaust gas pipe 39 from the absorber 24, is fed to a stack 40, and is discharged into the atmosphere from the stack 40.

On the other hand, among the boiler exhaust gas fed from the boiler 1, boiler exhaust gas not passing through the carbon dioxide separation and capture process flows down through an exhaust gas by-pass pipe 38 branching from the boiler exhaust gas pipe 34 on the upstream side of the feed gas blower 35, joins the absorber exit boiler exhaust gas pipe 39, and is led to the stack 40. On the exhaust gas by-pass pipe 38, a by-pass butterfly valve 37 for controlling the flow rate of the exhaust gas by-pass pipe 38 is installed. By controlling the opening angle of the by-pass butterfly valve 37, the flow rate of boiler exhaust gas by-passing the carbon dioxide separation and capture apparatus 200 is controlled.

The rich absorbing liquid which absorbed carbon dioxide contained in the boiler exhaust gas in the absorber 24 and contains much of carbon dioxide is fed to a rich amine pump 25, is pressurized, then is fed to a rich/lean amine exchanger 26, and is heated up to about 100° C. The rich absorbing liquid heated by the rich/lean amine exchanger 26 is fed to the desorber 21, is further heated up to about 120° C. to 130° C. in the desorber 21, and separates carbon dioxide absorbed from the boiler exhaust gas.

The carbon dioxide separated from the rich absorbing liquid is fed to a desorber exit gas cooler 29 from the desorber 21 and is cooled. The carbon dioxide cooled by the desorber exit gas cooler 29 is fed to a reflux drum 30 and moisture contained in the gas is separated. The carbon dioxide separated moisture in the reflux drum 30 flows down through the $CO_2$ exhaust pipe and is fed to a $CO_2$ liquefying and storing facility (not drawn).

The moisture separated from the carbon dioxide separation and capture apparatus 200 in the reflux drum 30 is fed to a reflux pump 31 from the reflux drum 30 to be pressurized and is returned to the desorber 21.

A part of the absorbing liquid in the desorber 21 is pulled out through a rich amine extract pipe 22 and is fed to the reboiler 18 of the carbon dioxide separation and capture apparatus 200. The absorbing liquid fed to the reboiler 18 of the desorber 21 is heated to steam in the reboiler 18. The absorbing liquid converted to steam in the reboiler 18 of the carbon dioxide separation and capture apparatus flows down through a heating steam return pipe 23 of the carbon dioxide separation and capture apparatus 200, is returned to the desorber 21, and is used as a heating source for the rich absorbing liquid.

To the reboiler 18, the steam discharged from the high-pressure turbine 3 and the extraction steam extracted from the intermediate-pressure turbine 7 are fed as a heating source and in the reboiler 18, the absorbing liquid is heated by the fed extraction steam to generate steam.

The absorbing liquid that separated carbon dioxide in the desorber 21 is fed to the rich/lean amine exchanger 26 from the desorber 21 and exchanges heat with the rich absorbing liquid in the rich/lean amine exchanger 26 to be cooled. The absorbing liquid cooled in the rich/lean amine exchanger 26 is fed to a lean amine pump 27 to be pressurized and is fed to a lean amine trim cooler 28. The absorbing liquid fed to the lean amine trim cooler 28 is cooled and then is returned to the absorber 24. As mentioned above, the carbon dioxide separation and capture apparatus 200 is structured so as to circulate between the absorber 24 and the desorber 21.

The steam pipe system for feeding steam taken out from the high-pressure turbine 3 and the intermediate-pressure turbine 7 to the reboiler 18 will be explained below. The steam pipe system includes an extraction steam pipe 14 for connecting the high-pressure turbine exhaust pipe 4 and the reboiler 18 and an intermediate-pressure turbine exhaust pipe 8 connected to the extraction steam pipe 14 and the intermediate-pressure turbine 7.

The high-pressure turbine exhaust pipe 4 for feeding steam discharged from the high-pressure turbine 3 to the boiler 1 is connected to the cold reheat pipe 5 and branches to the extraction steam pipe 14. The extraction steam pipe 14 branches further halfway, and one side branched is connected to the reboiler 18, and the other side is connected to a reclaimer 19. On the steam pipe of the extraction steam pipe 14 branching on the side of the reboiler 18, a pressure control valve 32 is installed and on the steam pipe of the extraction steam pipe 14 branching on the side of the reclaimer 19, a pressure control valve 33 is installed.

Further, a part of the steam extracted from the intermediate-pressure turbine 7 flows down through the intermediate-pressure turbine exhaust pipe 8, joins the extraction steam pipe 14, and is fed to the reboiler 18 and the reclaimer 19.

Next, while the steam turbine is under the partial load operation, the steam feed source switching device for switching the steam feed source for feeding steam to the reboiler 18 to switch between the high-pressure turbine 3 and the intermediate-pressure turbine 7 so as to satisfy the steam pressure requested by the reboiler 18 will be explained. The steam feed source switching device includes an extraction control valve 17 installed in the extraction steam pipe 14 and an extraction control valve 45 installed in the intermediate-pressure turbine exhaust pipe 8.

In the extraction steam pipe 14, on the upstream side of the junction of the extraction steam pipe 14 and the intermediate-pressure turbine exhaust pipe 8 in the steam flow direction, a pressure control valve 16 for adjusting the pressure of the extraction steam to be fed to the reboiler 18 and the extraction control valve 17 for switching the heating source for feeding the extraction steam to the reboiler 18 are provided. So as to satisfy the steam pressure requested by the reboiler 18 while the steam turbine is under the partial load operation, by controlling the opening angles of the extraction control valve 17 and the extraction control valve 45 installed in the intermediate-pressure turbine exhaust pipe 8, the heating source for feeding the extraction steam to the reboiler 18 is switched between the exhaust gas of the high-pressure turbine 3 and the exhaust gas of the intermediate-pressure turbine 7. For example, when feeding from the intermediate-pressure turbine 7, the extraction control valve 17 is closed and the extraction control valve 45 is opened. Further, when feeding from the high-pressure turbine 3, the extraction control valve 17 is opened and the extraction control valve 45 is closed.

Next, the pressure regulation device for regulating the pressure of steam flowing down through the steam pipe system from the intermediate-pressure turbine 7 toward the reboiler 18 will be explained. As the pressure regulation device, the pressure control valve 15 is installed in the crossover pipe 9. By narrowing the opening angle of the pressure control valve 15, the pressure of the extraction steam of the intermediate-pressure turbine 7 on the upstream side can be increased. Therefore, the pressure control valve 15, while the steam turbine is under the partial load operation, so that the pressure of steam flowing down through the steam pipe system from the intermediate-pressure turbine 7 toward the reboiler 18 satisfies the steam pressure requested by the reboiler 18, is controlled in the opening angle.

Figure 2:
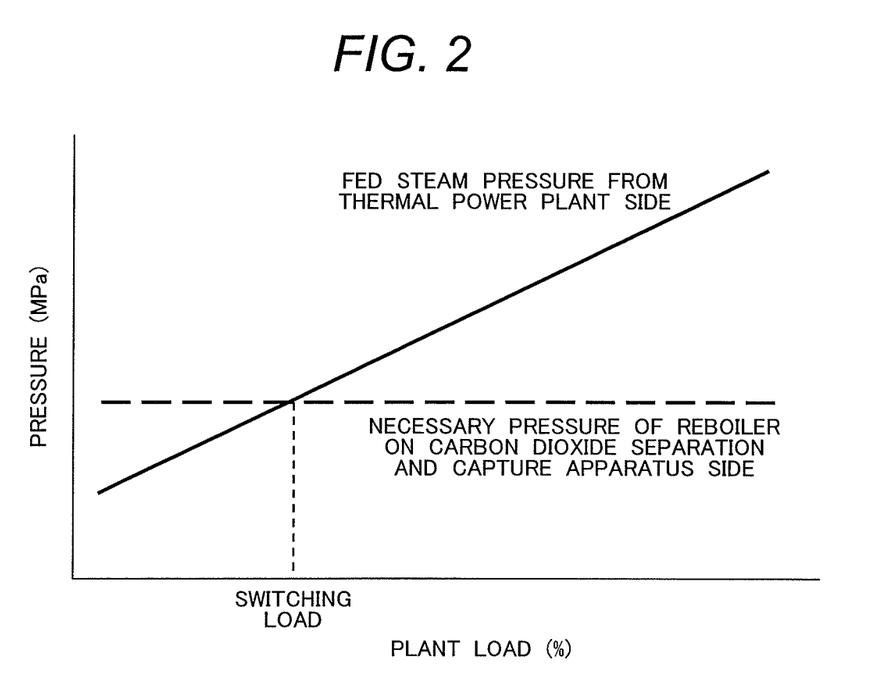
FIG. 2 is an illustration for showing the relationship between the necessary pressure of the carbon dioxide separation and capture apparatus and the fed gas pressure from the steam turbine.

FIG. 2 shows the relationship between the necessary pressure for decomposing carbon dioxide by the reboiler 18 of the carbon dioxide separation and capture apparatus 200 and the steam pressure to be fed to the carbon dioxide separation and capture apparatus 200 from the side of the steam turbine 100.

The request pressure of the carbon dioxide separation and capture apparatus 200 is almost fixed independently of the plant load. However, the pressure of fed steam from the side of the steam turbine 100 changes depending upon the plant load. Therefore, if the steam turbine is partially loaded, the fed gas pressure may be lowered than the necessary pressure of the carbon dioxide separation and capture apparatus 200. The plant load at this time will be called a switching load hereinafter. At this switching load, the fed gas pressure from the side of the steam turbine 100 to the carbon dioxide separation and capture apparatus 200 is insufficient. On the other hand, since carbon dioxide is separated from the absorbing liquid in the desorber 21, the steam pressure requested by the reboiler 18 is maintained constant. Therefore, in this state, the carbon dioxide separation and capture apparatus 200 cannot maintain its operation.

More concretely, in a higher load zone than the switching load, steam extracted from the intermediate-pressure turbine 7 is fed to the carbon dioxide separation and capture apparatus 200. However, if the plant load lowers, the extraction steam pressure of the intermediate-pressure turbine 7 does not satisfy the required value of the carbon dioxide separation and capture apparatus 200. Therefore, the steam feed source to the carbon dioxide separation and capture apparatus 200 is switched from the extraction steam of the intermediate-pressure turbine 7 to steam taken out from the high-pressure turbine 3 on a higher pressure side. By this switching control, even while the steam turbine is under the partial load operation, the steam pressure satisfies the required pressure of the carbon dioxide separation and capture apparatus 200 and the carbon dioxide separation and capture apparatus 200 can maintain its operation.

Figure 3:
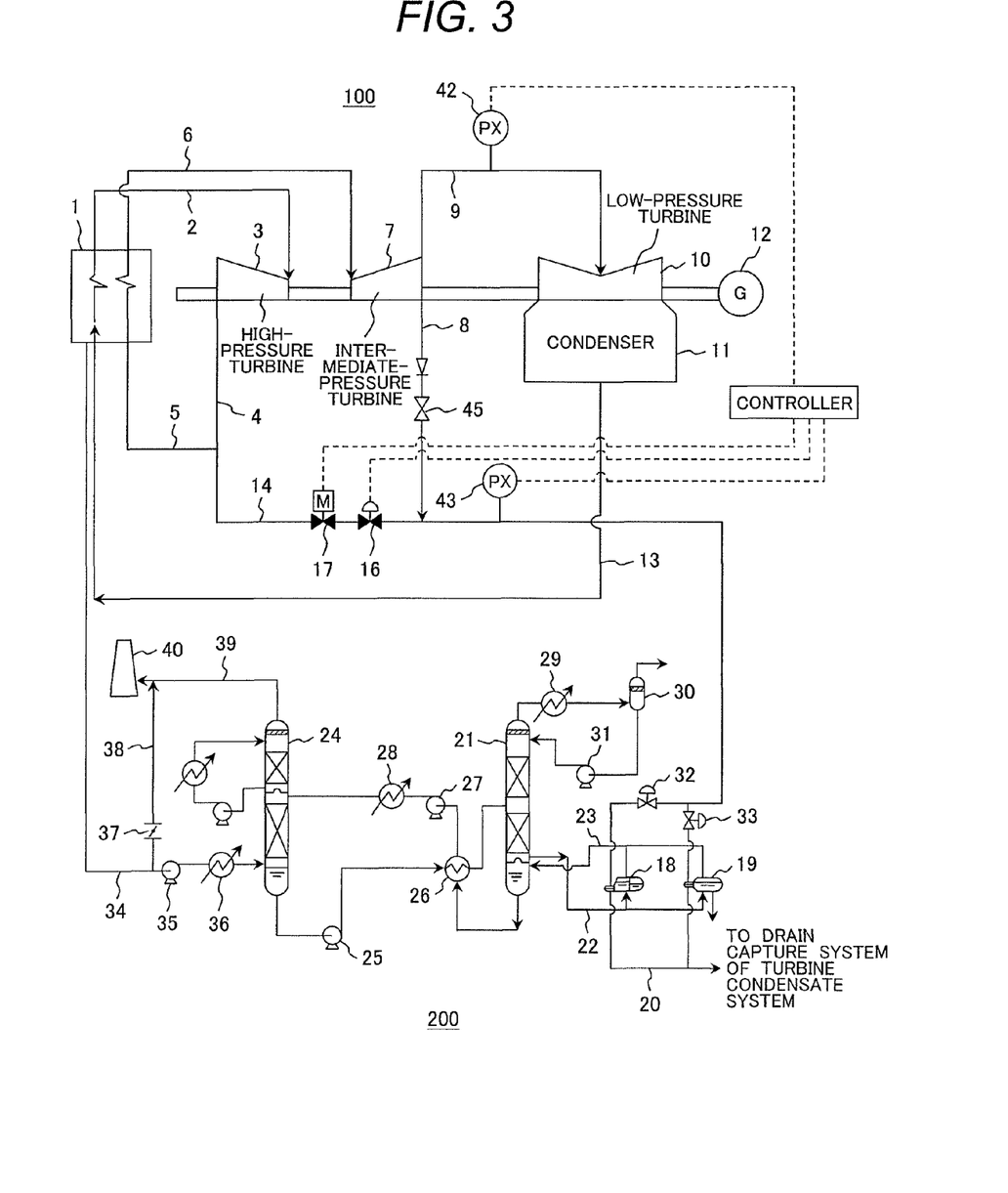
FIG. 3 is a schematic system block diagram of the thermal power plant including the carbon dioxide separation and capture apparatus in the case in which the crossover pipe is not equipped with a pressure control valve.
Figure 4:
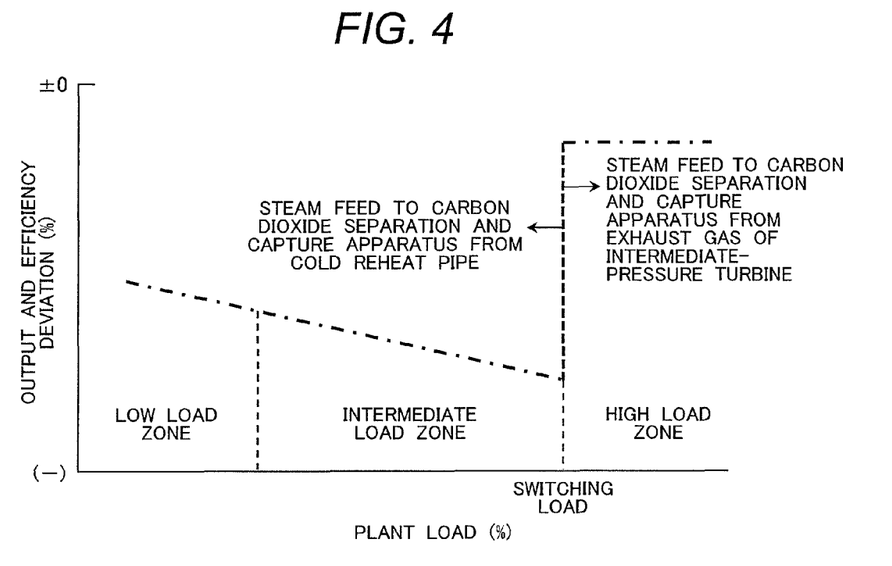
FIG. 4 is an illustration for showing the plant output and efficiency deviation characteristics of the thermal power plant shown in FIG. 3.
Figure 7:
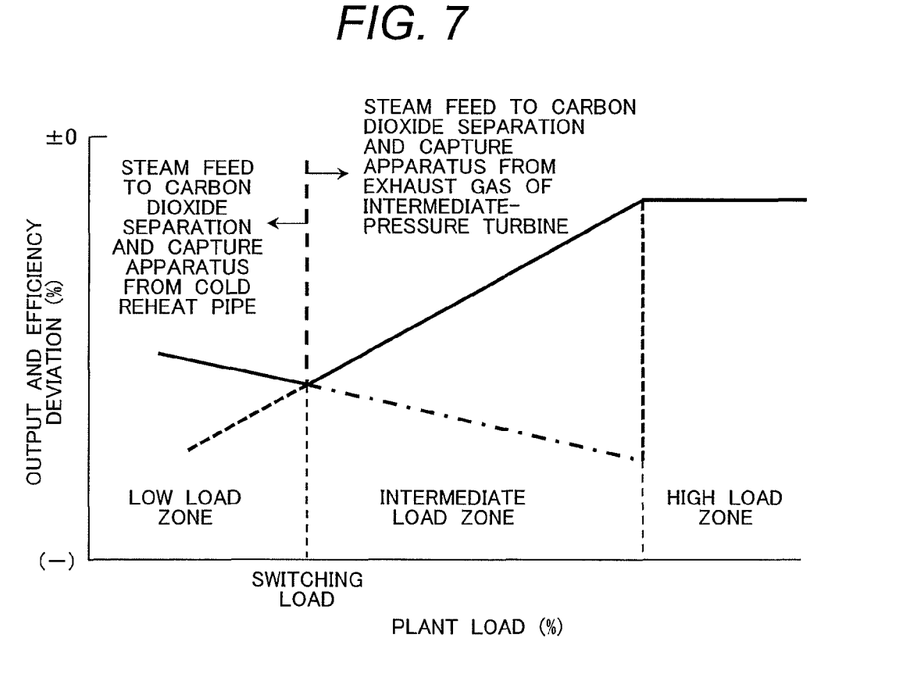
FIG. 7 is an illustration for showing the plant output and efficiency deviation characteristics of the thermal power plant relating to the embodiment of the present invention shown in FIG. 1.

FIG. 3 shows the schematic system block diagram of the thermal power plant including the carbon dioxide separation and capture apparatus in the case in which the crossover pipe 9 is not equipped with the pressure control valve 15. FIG. 4 shows the plant output and efficiency deviation characteristics of the thermal power plant including the carbon dioxide separation and capture apparatus in the case in which the crossover pipe 9 is not equipped with the pressure control valve 15 which is shown in FIG. 3. In FIG. 4, the axis of abscissas indicates the plant load and the axis of ordinates indicates the deviation rates of the output and efficiency at each load when the output and efficiency at the time of the rated load are assumed as plus or minus 0% and shows that in the lower portion of the axis of ordinates, the output and efficiency are lowered from those at the time of the rated load, that is, the deviation is large. The same applies to FIGS. 5 and 7.

As shown in FIG. 4, in the higher load zone than the switching load, the steam taken out from the intermediate-pressure turbine 7 is fed to the carbon dioxide separation and capture apparatus 200 from the intermediate-pressure turbine exhaust pipe 8 via the extraction steam pipe 14. In a lower load zone than the switching load, the exhaust gas of the high-pressure turbine 3 is fed to the carbon dioxide separation and capture apparatus 200 from the cold reheat pipe 5 via the extraction steam pipe 14. The reason that the output and efficiency deviations are largely changed before and after the switching load is that the fed steam feed source to the carbon dioxide separation and capture apparatus 200 is switched from the intermediate-pressure turbine exhaust pipe 8 to the cold reheat pipe 5, thus the work load of the intermediate-pressure turbine 7 on the downstream side is reduced and the generated energy of the intermediate-pressure turbine 7 is reduced.

Figure 5:
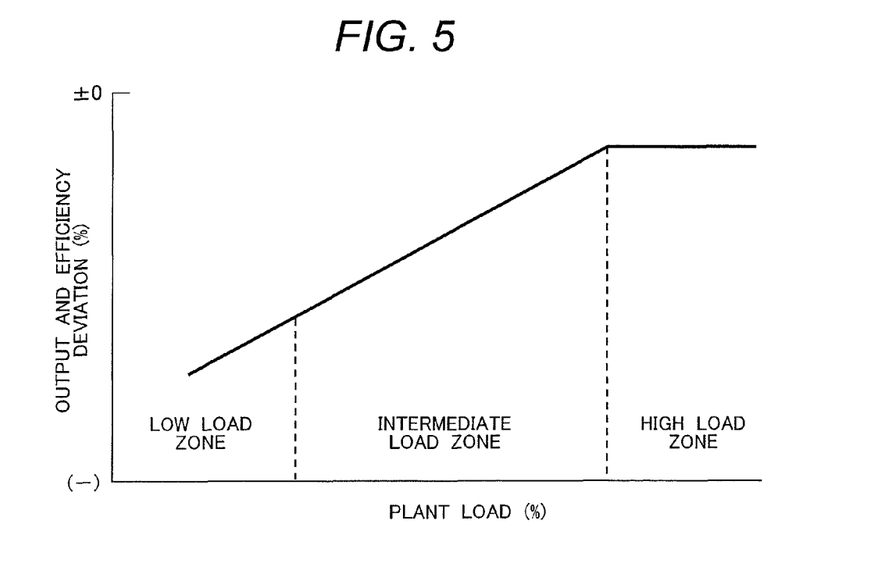
FIG. 5 is an illustration for showing the plant output and efficiency deviation characteristics in the case in which the crossover pipe is equipped with a pressure control valve.
Figure 6:
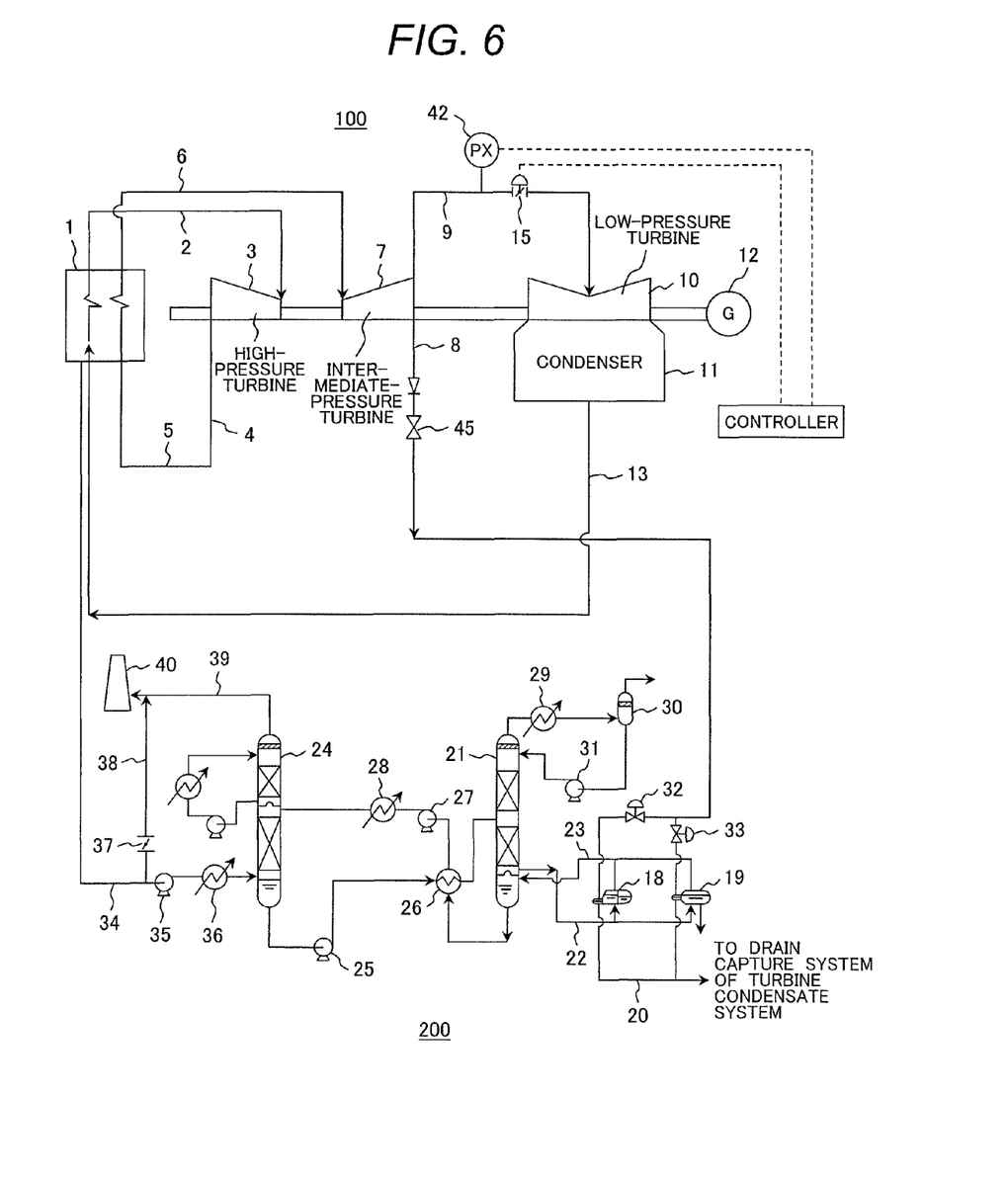
FIG. 6 is a schematic system block diagram of the thermal power plant including the carbon dioxide separation and capture apparatus in the case in which the crossover pipe is equipped with a pressure control valve.

FIG. 5 shows the plant output and efficiency deviation characteristics of the thermal power plant including the carbon dioxide separation and capture apparatus in the case in which the crossover pipe 9 is equipped with the pressure control valve 15.

As shown in FIG. 5, compared with the case shown in FIGS. 3 and 4 that the crossover pipe 9 is not equipped with the pressure control valve 15, the output and efficiency deviations in the intermediate load zone are reduced. In the case in which the fed steam feed source is the intermediate-pressure turbine exhaust pipe 8, the steam after power generation by the intermediate-pressure turbine 7 is fed to the carbon dioxide separation and capture apparatus 200. Therefore, compared with the case that steam is fed from the cold reheat pipe 5 to the carbon dioxide separation and capture apparatus 200, the work of the intermediate-pressure turbine 7 is more, so that the output and efficiency deviations are reduced. However, in the low load zone, the case that steam is fed from the cold reheat pipe 5, the output and efficiency deviations are reduced.

Therefore, in the low load zone, if the characteristics shown in FIG. 4 are adopted, the output and efficiency deviations are reduced. Namely, by adoption of FIG. 7, which is a combination of FIGS. 4 and 5, the switching load can be reduced and the plant output and efficiency can be prevented from reduction. Further, in FIG. 7, the output and efficiency deviation characteristics of this embodiment are shown by a solid line. In the higher load zone than the original switching load, the opening angle of the pressure control valve 15 installed in the crossover pipe 9 is totally opened and steam is fed from the intermediate-pressure turbine exhaust pipe 8. Next, if the pressure control valve 15 installed in the crossover pipe 9 is narrowed in the opening angle, the pressure reduction of the extraction steam flowing down through the intermediate-pressure turbine exhaust pipe 8 on the upstream side can be made smaller, so that in the intermediate load zone, by controlling (narrowing the opening angle available) the opening angle of the pressure control valve 15 installed in the crossover pipe 9, the fed gas pressure required by the carbon dioxide separation and capture apparatus 200 is maintained and steam is fed from the intermediate-pressure turbine exhaust pipe 8 to the carbon dioxide separation and capture apparatus 200. Furthermore, in the low load zone, the opening angle of the pressure control valve 15 installed in the crossover pipe 9 is totally opened and, by using the extraction control valve 17 and the extraction control valve 45 which are a steam feed source switching device, the fed steam feed source is switched to the cold reheat pipe 5 on the side of the high-pressure turbine 3.

In the crossover pipe 9, as a pressure regulation device for regulating the pressure of steam flowing down through the steam pipe system from the intermediate-pressure turbine 7 toward the reboiler 18, the pressure control valve 15 is installed, thus the switching load can be reduced. The switching load is reduced, so that the generated energy by the intermediate-pressure turbine 7 in the intermediate load zone is increased, so that the output and efficiency deviations can be made smaller than the conventional ones.

Further, the opening angle of the pressure control valve 16 installed in the extraction steam pipe 14 which is a connection pipe between the cold reheat pipe 5 and the carbon dioxide separation and capture apparatus 200 is controlled (narrowing the opening angle available) so as to satisfy the necessary pressure on the side of the carbon dioxide separation and capture apparatus 200.

Figure 8:
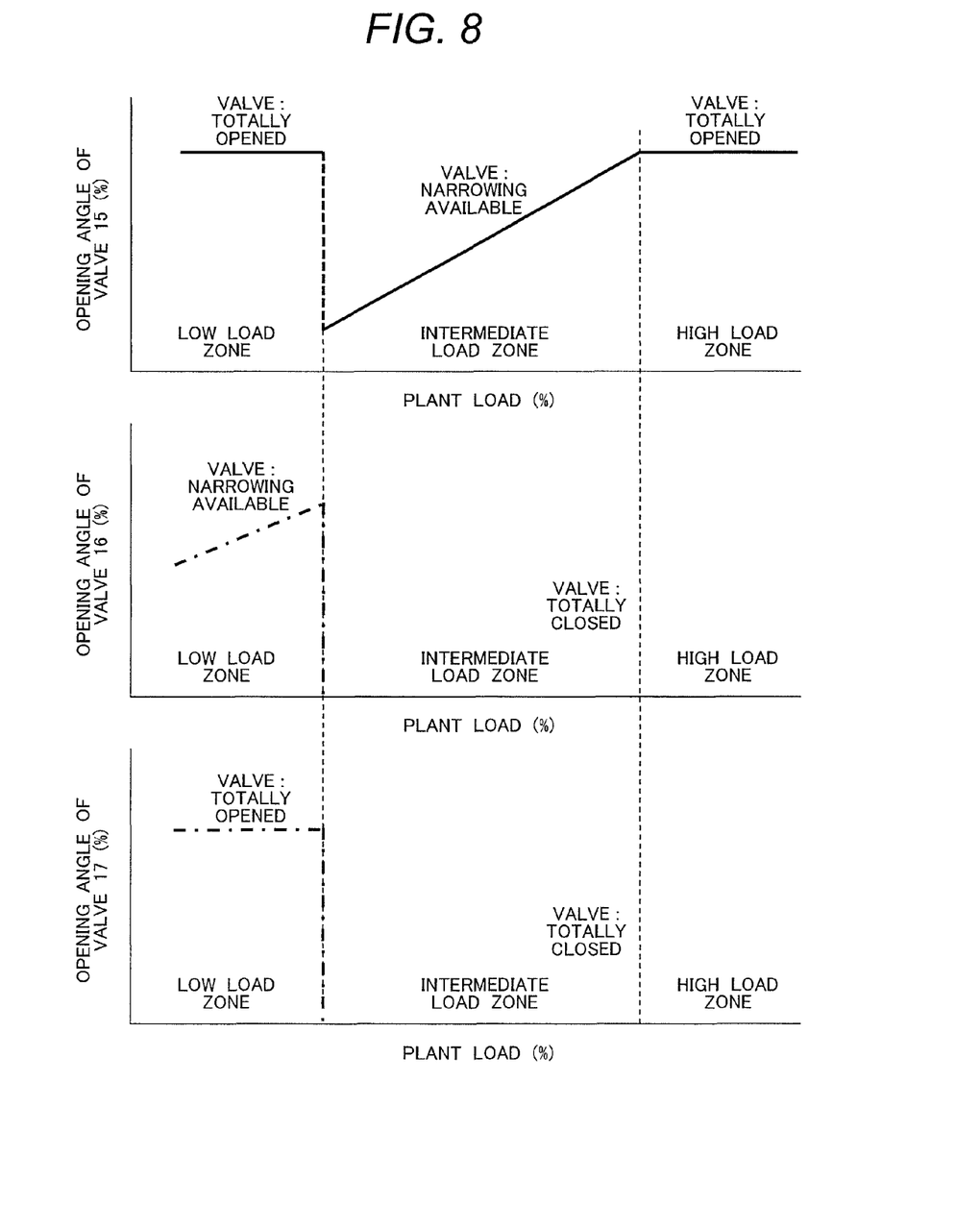
FIG. 8 is a schematic diagram of the opening angle control for the pressure control valve installed in the crossover pipe and the pressure control valve installed in the extraction steam pipe.

FIG. 8 shows the opening angle characteristics of the pressure control valve 15 installed in the crossover pipe 9 and the pressure control valve 16 and the extraction control valve 17 which are installed in the cold reheat pipe 5. Table 1 shows a list summarizing the opening angle characteristics of the valves shown in FIG. 8.

TABLE 1

|  | Low load zone | Intermediate load zone | High load zone |
| --- | --- | --- | --- |
| Pressure control valve 15 | Totally opened | Opening angle control | Totally opened |
| Pressure control valve 16 | Opening angle control | Totally closed | Totally closed |
| Extraction control valve 17 | Totally opened | Totally closed | Totally closed |

In the high load zone while at the rated load operation, the pressure control valve 15 is totally opened and the pressure control valve 16 and the extraction control valve 17 are totally closed. In the intermediate load zone, the opening angle control for narrowing the opening angle of the pressure control valve 15 is performed and the pressure control valve 16 and the extraction control valve 17 are totally closed. Further, on the crossover pipe 9 on the upstream side of the pressure control valve 15, a pressure gauge 42 is installed and the opening angle control for the pressure control valve 15, by detecting the necessary pressure of the carbon dioxide separation and capture apparatus 200, controls the front pressure using the pressure value detected by the pressure gauge 42. In the low load zone, the pressure control valve 15 and the extraction control valve 17 are totally opened and the opening angle control for the pressure control valve 16 is performed. On the downstream side of the pressure control valve 16 of the extraction steam pipe 14, a pressure gauge 43 is installed and the pressure control valve 16 of the cold reheat pipe 5 controls the back pressure using the pressure value detected by the pressure gauge 43. Further, it is when the pressure set value of the pressure control valve 15 installed on the crossover pipe 9 becomes lower than the fed gas pressure set value to the carbon dioxide separation and capture apparatus 200 that switching the steam feed source for feeding steam to the carbon dioxide separation and capture apparatus 200 is made or that the extraction control valve 17 of the cold reheat pipe 5 is opened.

According to this embodiment, since the switching load generated when switching the feed source of steam to be fed to the reboiler 18 of the carbon dioxide separation and capture apparatus 200 between the intermediate-pressure turbine and the high-pressure turbine can be moved to a lower load zone than usual, the generated energy of the intermediate-pressure turbine can be increased. Therefore, in the case that the plant is partially loaded, it is possible to prevent the plant output and efficiency from reduction while ensuring the necessary pressure to the carbon dioxide separation and capture apparatus 200.

What we claim is:

1. A thermal power plant comprising: a boiler for burning fossil fuel to generate steam, a steam turbine including a high-pressure turbine, an intermediate-pressure turbine, and a low-pressure turbine which are driven by steam generated in the boiler, an absorber for absorbing and capturing CO2 contained in boiler exhaust gas discharged from the boiler in an absorbing liquid, a desorber for circulating the absorbing liquid between the desorber and the absorber and separating CO2 from the absorbing liquid that has absorbed CO2, a reboiler for feeding a heating source for separating CO2 from the absorbing liquid to the desorber, a steam pipe system for feeding steam taken out from the high-pressure turbine and the intermediate-pressure turbine to the reboiler, and
a steam feed source switching device which is installed in the steam pipe system for switching a steam feed source for feeding steam to the reboiler between the intermediate-pressure turbine and the high-pressure turbine so as to satisfy a steam pressure required by the reboiler while the steam turbine is under a partial load operation.

2. The thermal power plant according to claim 1, further comprising:
a pressure control device is installed in a pipe for feeding the steam discharged from the intermediate-pressure turbine to the low-pressure turbine for regulating a pressure of the steam flowing down through the steam pipe system from the intermediate-pressure turbine toward the reboiler.

3. The thermal power plant according to claim 2, wherein: the pressure control device is provided with a pressure control valve to control an opening angle thereof while the steam turbine is under the partial load operation, so that the pressure of the steam flowing down through the steam pipe system from the intermediate-pressure turbine toward the reboiler satisfies a steam pressure required by the reboiler.

4. The thermal power plant according to claim 1, wherein: the steam feed source switching device is provided with a switching valve for switching the steam feed source for feeding the steam to the reboiler from the intermediate-pressure turbine to the high-pressure turbine, when the pressure of the steam fed from the intermediate-pressure turbine to the reboiler is equal to or lower than the steam pressure required by the reboiler, and
the steam pipe system is provided with a pressure control valve to control an opening angle thereof, so that the pressure of the steam fed from the high-pressure turbine to the reboiler satisfies the steam pressure required by the reboiler is installed.

5. A control method for a thermal power plant comprising: a boiler for burning fossil fuel to generate steam,
a steam turbine including a high-pressure turbine, an intermediate-pressure turbine, and a low-pressure turbine which are driven by the steam generated in the boiler,
a carbon dioxide separation and capture apparatus including an absorber for absorbing and capturing CO2 contained in boiler exhaust gas discharged from the boiler into an absorbing liquid, a desorber for circulating the absorbing liquid between the desorber and the absorber and separating CO2 from the absorbing liquid that has absorbed CO2, and a reboiler for feeding a heating source for separating CO2 from the absorbing liquid to the desorber, and
a steam pipe system for feeding steam taken out from the high-pressure turbine and the intermediate-pressure turbine to the reboiler, wherein:
a steam feed source for feeding steam to the reboiler is controlled to switch from the intermediate-pressure turbine to the high-pressure turbine when the pressure of the steam fed from the intermediate-pressure turbine to the reboiler is equal to or lower than the steam pressure required by the reboiler.

6. The control method for a thermal power plant according to claim 5, wherein:
the steam turbine is provided with a pressure control valve installed in a pipe for feeding the steam discharged from the intermediate-pressure turbine to the low-pressure turbine, and
the pressure control valve is controlled an opening angle thereof while the steam turbine is under the partial load operation, so that the pressure of the steam flowing down through the steam pipe system from the intermediate-pressure turbine toward the reboiler satisfies a steam pressure required by the reboiler.

7. The control method for a thermal power plant according to claim 5, wherein:
the pressure control valve provided in the steam pipe system is controlled an opening angle thereof, so that the pressure of the steam flowing down from the high-pressure turbine toward the reboiler satisfies a steam pressure required by the reboiler.

8. A steam turbine comprising: a boiler for burning fossil fuel to generate steam,
a steam turbine including a high-pressure turbine, an intermediate-pressure turbine and a low-pressure turbine which are driven by the steam generated in the boiler,
a carbon dioxide separation and capture apparatus for separating and capturing carbon dioxide from exhaust gas discharged from the boiler, to which the steam is fed from the high-pressure turbine and the intermediate-pressure turbine, and
a steam feed source switching device is installed for switching a steam feed source for feeding steam to the carbon dioxide separation and capture apparatus between the high-pressure turbine and the intermediate-pressure turbine so as to satisfy a steam pressure required by the carbon dioxide separation and capture apparatus while the steam turbine is under a partial load operation.

9. The steam turbine according to claim 8, further comprising:
a pressure control device is provided in a pipe for feeding the steam discharged from the intermediate-pressure turbine to the low-pressure turbine for regulating a pressure of the steam fed from the intermediate-pressure turbine to the carbon dioxide separation and capture apparatus.

10. The steam turbine according to claim 9, wherein: the pressure control device is provided with a pressure control valve to control so as to totally open thereof while the steam turbine is at a rated load operation, and
the pressure control valve is controlled in an opening angle thereof so that the pressure of the steam fed from the intermediate-pressure turbine to the carbon dioxide separation and capture apparatus satisfies the steam pressure required by the carbon dioxide separation and capture apparatus while the steam turbine is under a partial load operation.

11. The steam turbine according to claim 9, further comprising:
a steam pipe system for feeding the steam taken out from the high-pressure turbine and the intermediate-pressure turbine to the carbon dioxide separation and capture apparatus,
the steam feed source switching device is provided with a switching valve installed in the steam pipe system for switching the steam feed source for feeding the steam to the carbon dioxide separation and capture apparatus from the intermediate-pressure turbine to the high-pressure turbine when the pressure of the steam fed from the intermediate-pressure turbine to the carbon dioxide separation and capture apparatus is reduced to a pressure equal to or lower than the steam pressure required by the carbon dioxide separation and capture apparatus, and
the steam pipe system is provided with a pressure control valve to control an opening angle thereof, so that the pressure of the steam fed from the high-pressure turbine to the carbon dioxide separation and capture apparatus satisfies the steam pressure required by the carbon dioxide separation and capture apparatus.

12. The thermal power plant according to claim 3, wherein:
the steam feed source switching device is provided with a switching valve for switching the steam feed source for feeding the steam to the reboiler from the intermediate-pressure turbine to the high-pressure turbine, when the pressure of the steam fed from the intermediate-pressure turbine to the reboiler is equal to or lower than the steam pressure required by the reboiler, and
the steam pipe system is provided with a pressure control valve to control an opening angle thereof, so that the pressure of the steam fed from the high-pressure turbine to the reboiler satisfies the steam pressure required by the reboiler is installed.

13. The control method for a thermal power plant according to claim 6, wherein:
the pressure control valve provided in the steam pipe system is controlled an opening angle thereof, so that the pressure of the steam flowing down from the high-pressure turbine toward the reboiler satisfies a steam pressure required by the reboiler.

14. The steam turbine according to claim 10, further comprising:
a steam pipe system for feeding the steam taken out from the high-pressure turbine and the intermediate-pressure turbine to the carbon dioxide separation and capture apparatus,
the steam feed source switching device is provided with a switching valve installed in the steam pipe system for switching the steam feed source for feeding the steam to the carbon dioxide separation and capture apparatus from the intermediate-pressure turbine to the high-pressure turbine when the pressure of the steam fed from the intermediate-pressure turbine to the carbon dioxide separation and capture apparatus is reduced to a pressure equal to or lower than the steam pressure required by the carbon dioxide separation and capture apparatus, and
the steam pipe system is provided with a pressure control valve to control an opening angle thereof, so that the pressure of the steam fed from the high-pressure turbine to the carbon dioxide separation and capture apparatus satisfies the steam pressure required by the carbon dioxide separation and capture apparatus.

* * * * *